(12) United States Patent
Xiao et al.

(10) Patent No.: US 12,235,905 B2
(45) Date of Patent: *Feb. 25, 2025

(54) CONTENT DISPLAY AND CLUSTERING SYSTEM

(71) Applicant: Roku, Inc., San Jose, CA (US)

(72) Inventors: Fei Xiao, San Jose, CA (US); Ronica Jethwa, Mountain View, CA (US); Zidong Wang, San Jose, CA (US); Jing Lu, San Jose, CA (US); Jing Ye, San Jose, CA (US); Nam Vo, San Jose, CA (US); Jose Sanchez, San Jose, CA (US); Abhishek Bambha, Burlingame, CA (US); Khaldun Aidarabsah, San Jose, CA (US)

(73) Assignee: Roku, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/435,171

(22) Filed: Feb. 7, 2024

(65) Prior Publication Data

US 2024/0214630 A1 Jun. 27, 2024

Related U.S. Application Data

(63) Continuation of application No. 17/943,526, filed on Sep. 13, 2022, now Pat. No. 11,941,067.

(51) Int. Cl.
*G06F 16/906* (2019.01)
*G06F 16/75* (2019.01)
*H04N 21/433* (2011.01)
*H04N 21/45* (2011.01)

(52) U.S. Cl.
CPC ............ *G06F 16/906* (2019.01); *G06F 16/75* (2019.01); *H04N 21/4332* (2013.01); *H04N 21/4532* (2013.01)

(58) Field of Classification Search
CPC .............................. G06F 16/27; G06F 16/258
See application file for complete search history.

(56) References Cited

U.S. PATENT DOCUMENTS

2019/0325055 A1* 10/2019 Lee ..................... G06F 11/1448

FOREIGN PATENT DOCUMENTS

WO WO 2020/0234388 A1 * 11/2020

* cited by examiner

*Primary Examiner* — Baoquoc N To
(74) *Attorney, Agent, or Firm* — Sterne, Kessler, Goldstein & Fox P.L.L.C.

(57) ABSTRACT

Disclosed herein are various embodiments, for a content display and clustering system. An example embodiment operates by receiving a request to display the plurality of content items. At each of multiple levels different pairs of content items are identified and a similarity score is computed for each pair. A subset of pairs for which their similarity score exceeds a similarity threshold for the respective level are identified and clustered. This process is repeated for one or more iterations at the same level, and then the process is repeated for each of the multiple levels. A final clustered subset is identified, and output for display, responsive to the request to display the plurality of content items.

20 Claims, 7 Drawing Sheets

CONTENT DISPLAY AND CLUSTERING SYSTEM

CROSS-REFERENCE TO RELATED APPLICATIONS

This application is a continuation of U.S. Non-Provisional patent application Ser. No. 17/943,526, titled "Content Display and Clustering System" filed Sep. 13, 2022, which is incorporated by reference in its entirety.

BACKGROUND

With today's abundance of content options, it can become difficult for a user to select which program/content to watch. How the content is organized and displayed for the user becomes paramount then in both increasing user satisfaction, and also decreasing the amount of time and resources needed by the user to scroll and navigate through different content options.

SUMMARY

Provided herein are system, apparatus, article of manufacture, method and/or computer program product embodiments, and/or combinations and sub-combinations thereof, for content display and clustering.

An example embodiment operates by receiving a request to display a plurality of content items. At each of multiple levels, different pairs of content items are identified and a similarity score is computed for each pair. A subset of pairs for which their similarity score exceeds a similarity threshold for the respective level are identified and clustered. This process is repeated for one or more iterations at the same level, and then the process is repeated for each of the multiple levels. A final clustered subset is identified and output for display, responsive to the request to display the plurality of content items.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for content display and clustering.

Figure 1:
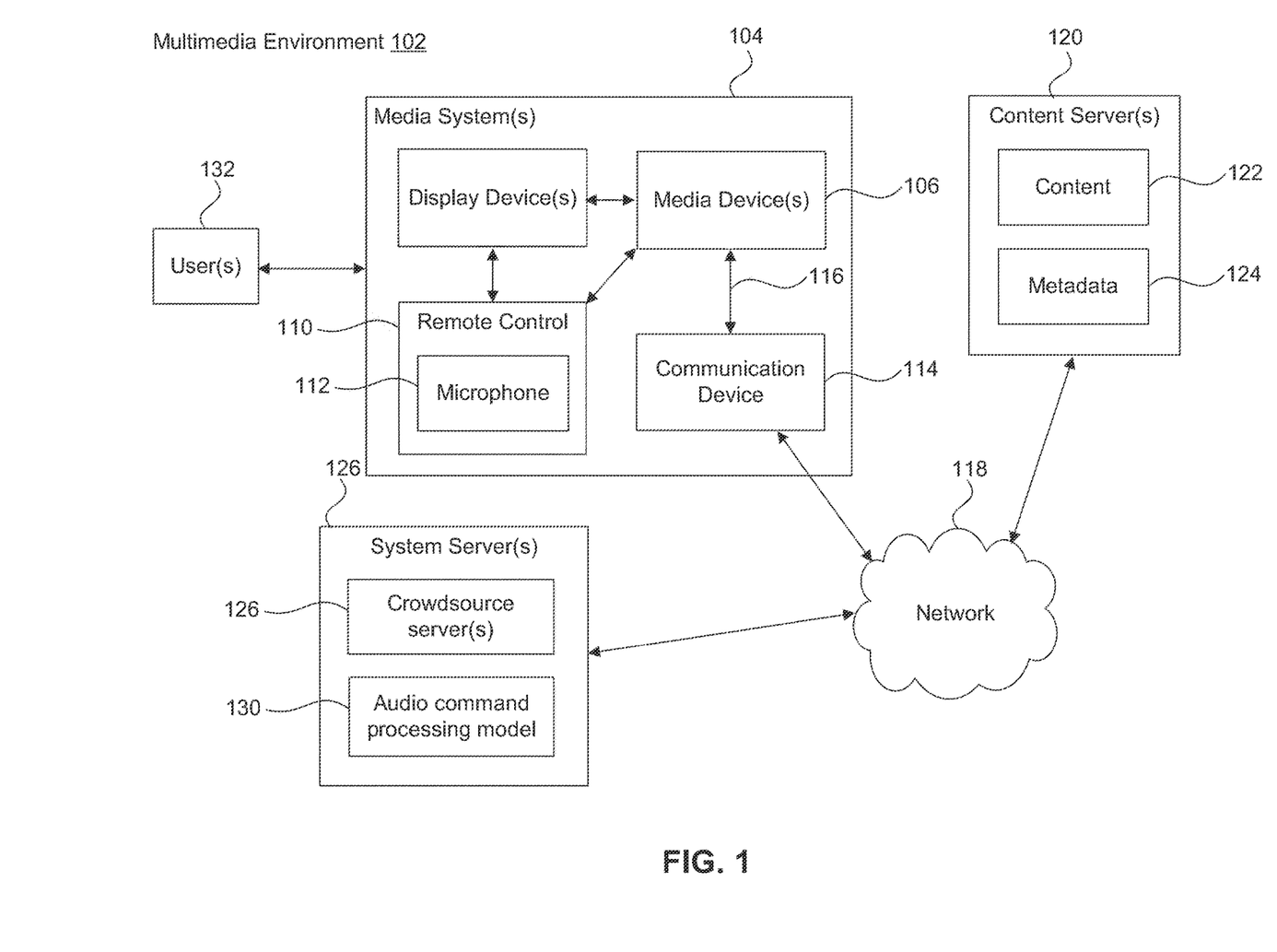
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the verbal command of user 132. The audio command processing module 130 may then forward the verbal command back to the media device 106 for processing.

Figure 2:
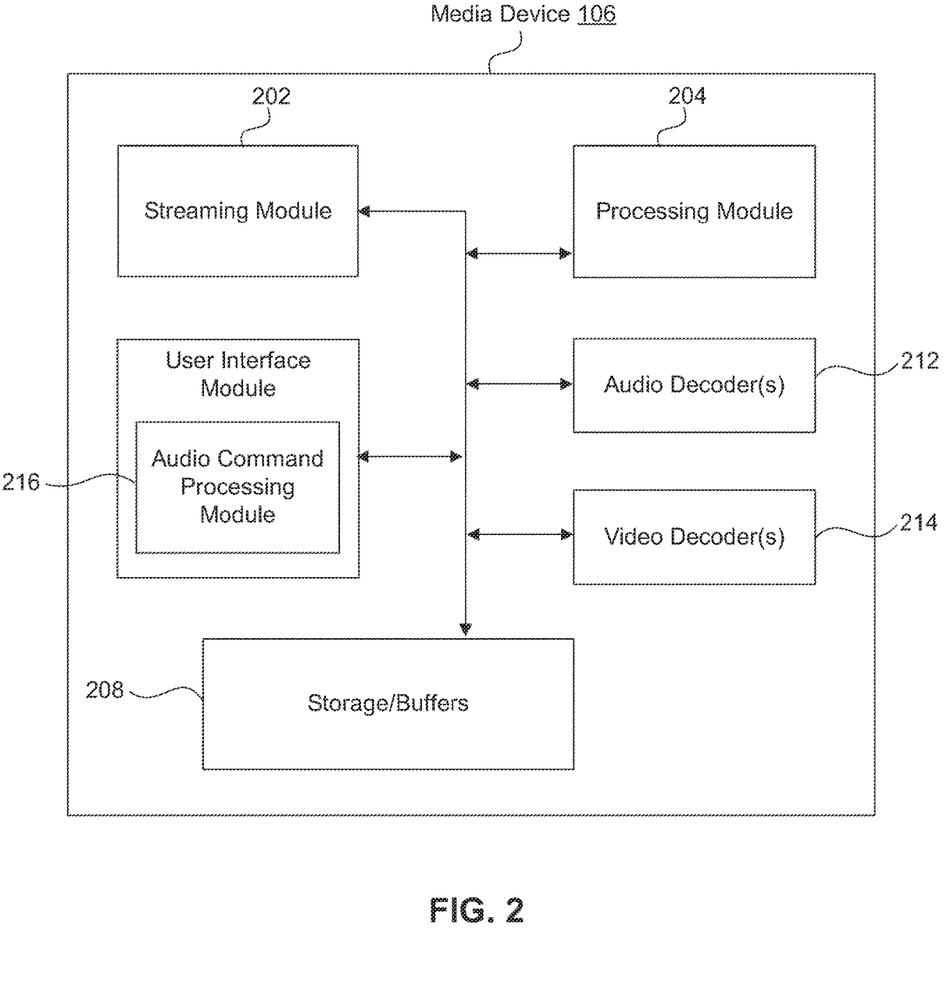
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Content Display and Clustering System

Figure 3:
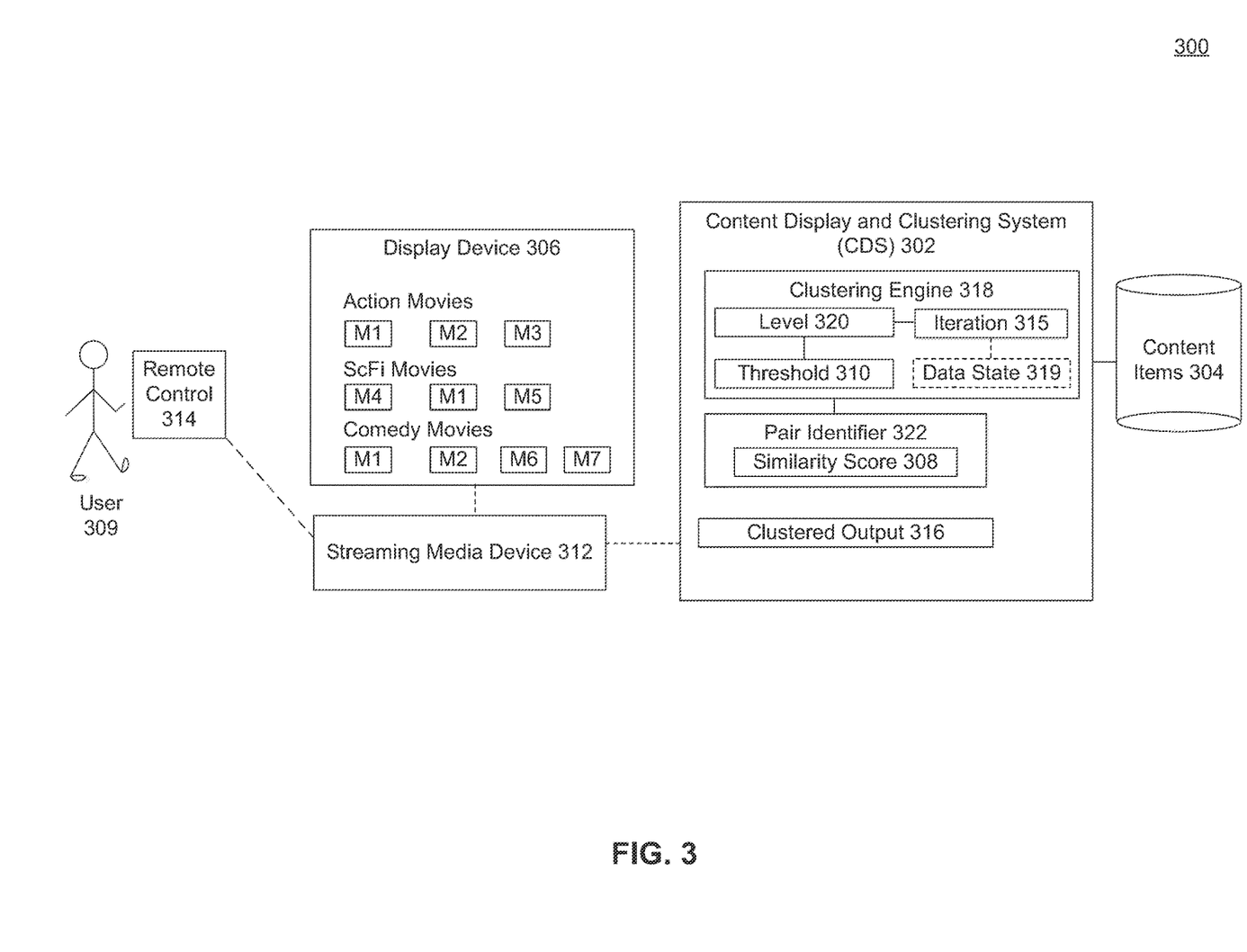
FIG. 3 is a block diagram illustrating a content display and clustering system (CDS), according to some example embodiments.

FIG. 3 is a block diagram 300 illustrating a content display and clustering system (CDS) 302, according to some example embodiments. CDS 302 organizes the content items 304 into various clusters for display, and provides organized display of the content items for display on a display device 306. From the organized display of content items, a user 309 may quickly identify and select one or of the content items 304 for purchase, viewing, posting, listening to, sharing, access, or other use or consumption.

In some embodiments, content items 304 may include multimedia, such as television shows, books, video games, movies, music, music videos, lectures, pictures, images, and/or art that may be selected for consumption by a user 309. In other embodiments, content items 304 may include any type of data files.

In some embodiments, content items 304 may include a group or set of unclustered files stored across one or more computing devices. In some embodiments, content items 304 may include information that may be used to sort the content items. Example information incudes title, by date of release or availability, the name of the studio/author/artist, file size, and length of content. The ability to sort content items 304 by name or other data is generally only helpful to a user who already knows what content item 304 for which they are looking. However, user 309 may be unsure of what to watch, and so the ability to sort the content items 304 may not be helpful.

In some embodiments, as discussed above, a user 309 may operate a streaming media device 312 to watch or consume content items 304, using a remote control 314. The streaming media device 312 may include any device that allows the user to stream, purchase, rent, or download content items 304. In some embodiments, streaming media device 312 may be connected (wired or wirelessly) to a display device 306, such as a monitor or television. In some embodiments, the streaming media device 312 may be integrated into the display device 306 (or vice versa), as a single device, such as a SMART television, laptop/tablet computer, or Internet of Things (IoT) device with one or more streaming media services through which a user 309 may select and consume various content items 304. In some embodiments, streaming media device 312 may include an app on a mobile phone, tablet, or laptop (e.g., display device 306—which may include a keyboard or interface that is used as remote control 314) which a user 309 may use to watch content items 304.

When a user 309 logs in to streaming media device 312 or otherwise indicates an interest in viewing content items 304, streaming media device 312 may provide a view or display of content items 304 to the user 309, via display device 306. However, rather than providing a random assortment of content items or content items simply sorted by name or date of addition, CDS 302 may organize or cluster the content items 304 into relevant groupings and this organized or clustered output 316 may be provided by streaming media device 312 to the user 309. The clustered output 316 may include the content items 304 having undergone organization or clustering by CDS 302 prior to or responsive to the request from user 309 to view content items 304.

In some embodiments, content items 304 may include data and/or metadata that may be used to compare two different content items 304 for similarities/differences. In some embodiments, the metadata may include user comments, the names of actors or artists involved in developing or creating the content item, title, studio/publisher, text of audio/speech of the content item, storylines, a history of previous clusterings, length, rating information (e.g., rated R, PG-13, parental advisory, etc.).

In some embodiments, this metadata (and/or other available data or information) may be used to compute or generate a similarity score 308 between two different content items 304. The similarity score 308 may indicate a degree or measure of similarity between two or more different content items 304. In some embodiments, the similarity score 308 may be between a cluster or grouping of multiple content items 304 and another unclustered content item 304. In some embodiments, the similarity score 308 may be a measure between two different clusters or groups of content items 304 (which may or may not include one or more overlapping content items 304).

Examples of content items 304 are illustrated on display device 306 as numbered boxes M1-M7. M1-M7 may be examples of different movies, however it is understood in other embodiments any multimedia files or data files may be used as described herein in addition to or in lieu of movies. For example, CDS 302 may have compared M1 to M2 to determine a similarity score 308 for the pairing, and M1 to M3 to determine a similarity score 308 for the pairing. And those pairings for which the similarity score 308 exceeding a threshold may have been merged, grouped, organized, or clustered together as described herein.

In some embodiments, a clustering engine 318 may periodically cluster content items 304. For example, a streaming service may add new content items 304 or remove existing content items on a nightly or weekly basis. In some embodiments, clustering engine 318 may perform clustering when or after content items 304 are updated (e.g., added, edited, or removed). Or, for example, if new items are added on a daily basis, CDS 302 may perform the clustering as described herein only every several days, and the new items may automatically be organized into their own new cluster of 'new items' until the next full clustering is performed by clustering engine 318.

In some embodiments, clustering engine 318 may perform clustering over a number of different levels 320, each level including one or more iterations 315. During each iteration 315, the various clusters of content items 304 (if any) and non-clustered content items 304 are compared and organized or clustered into new groupings. The clusters of content items 304 generated during a first iteration 315 at a first level 320, are then combined with the clusters of content items 304 generated during a later iteration(s) 315 at the same level 320. This combination of clusters is referred to as clustered output 316 which may then either output to streaming media device 312 (if there are no more remaining levels 320 to process) or may be input in the next level 320 for a new round of clustering across one or more iterations 315 at the new level 320.

For example, a first iteration 315 of a first level 320 may begin with a set of all non-clustered content items 304. During the first iteration 315, a subset or portion of the non-clustered items may have been identified for clustering together with their item pair, while another portion of the content items 304 may remain non-clustered. During the second iteration 315 at the first level 320, a different combination of the non-clustered content items may be paired, compared, and clustered (or not). This may continue for a number of different iterations 315 at the same level 320.

When the requisite number of iterations 315 have completed, the pairs which are deemed similar enough to each other (based on a comparison of a similarity score 308 of each pair to a threshold 310 for the level 320) may be merged together to generate clustered output 316 for the level 320. This clustered output 316 may then be provided as input for the next level 320 (and its next set of iterations 315). Or, if the final level 320 has completed, the clustered output 316 may be provided as output to stream media device 312. In some embodiments, each level 320 may include its own unique threshold 310. Threshold 310 may be a similarity threshold that indicates which to merge two different content items 304 (clusters of content items 304) together into a cluster. For example, if the similarity score 308 for two different items being compared meets or exceeds the threshold 310 for that level 320 of clustering, then the items may be merged into a single cluster (and that cluster may be propagated to the next level 320).

In some embodiments, each successive level 320 may include or have a threshold 310 that is less than the threshold 310 of the previous level 320. For example, a first level 320 may have a threshold value of 0.98, a second level 320 may have a threshold value of 0.90, and a third level 320 may have a threshold value of 0.85. The lower the threshold value 310, the more likely dissimilar content items 304 may be clustered or merged together into a cluster or grouping.

In some embodiments, threshold 310 may include a start threshold, an end threshold, and an decrement threshold. For example, the start threshold may be 0.99, the end threshold may be 0.1 and the decrement threshold could be 0.01. In this example, the looping may continue until the current threshold value equals the end threshold value after having been decremented after each iteration.

In some embodiments, the looping criteria may be based on the size of the largest cluster. For example, the looping and interactions, as described above, may continue to cluster items as long as the size of the largest threshold is less than 1000 items (or any other value).

In some embodiments, each level 320 may include the same or different numbers of iterations 315. For example, in some embodiments, the number of iterations 320 to be performed by clustering engine 318 may be a preset number (e.g., such as 3, 4, or 5 iterations). Or, for example, the number of iterations may vary per level (e.g., 4 iterations for level 0, 3 iterations for level 1, 2 iterations for level 2, and 1 iteration for any subsequent levels 320).

In some embodiments, the number of iterations 320 may continue at each level 320 until some trigger or data state 319 has been achieved or detected. For example, the data state 319 may indicate that the iterations 315 continue until no new clusters are created during the course of an iteration 315 for that level 320. Or, for example, the data state 319 may be to continue iterating that until the smallest cluster includes at least at least 3 new clusters have been generated or 4 iterations have been performed, whichever comes first. In some embodiments, the number of iterations 315 may correspond to the number of content items 304. For example, every 100 content items 304 may trigger an iteration 315. So, for example, if there are 321 content items 304, this may mean there are three iterations 315 per level 320, while 402 content items 304 may result in four iterations 315 per level 320.

During each iteration 315, a pair identifier 322 may identify different pairs of content items 304 (and/or clusters of multiple content items 304 from previous levels 320) and generate or compute a similarity score 308 on each pair. As noted above, the similarity score 308 for each pair may then be compared to the threshold 310 for that level 320 to determine whether or not to merge or cluster the pair together.

However, rather than clustering a single content item 304 into a single cluster or grouping, CDS 302 allows for a single content item 304 to be clustered into multiple different clusters across different iterations 315 at the same level 320 and/or across different levels 320. For example, as illustrated on display device 306, M1 is included in all three clusters of movies, while M2 is included in two of the clusters, and M7 is only within a single cluster.

In some embodiments, CDS 302 may allow for a single content item 304 to be clustered into multiple clusters by moving a copy of the content item 304 (or a pointer to the content item) into a cluster. For example, if a movie "Star Trek" is paired with another movie "Star Wars", and similarity score 308 exceeds threshold 310, the two movies may be clustered together into a "Star Wars" cluster. However "Star Trek" may still compared to other movies during another iteration at the same level 320, even after it has been clustered together with "Star Wars". For example, "Star Trek" may be compared to other movies such as "Gremlins", "Romancing the Stone", and "Star Gate".

It may be determined that "Star Trek" has a similarity score 308 with "Star Gate" that exceeds the threshold 310, and the two movies may be merged together into a "Star Gate" cluster. Then for example, on the following iteration 315 or level 320, the Star Wars cluster (including both Star Wars and Star Trek), the Star Gate cluster (including both Star Trek and Star Gate), Gremlins, and Romancing the Stone may all be compared for further or additional clustering. In the example illustrated on display device 306, three clusters (Action Movies, Sci-Fi Movies, and Comedy Movies are displayed).

In some embodiments, CDS 302 may be operating across multiple different computing devices simultaneously, or in parallel, thus reducing the amount of time that may be required to complete the clustering process of content items 304. For example, if a level 320 includes five iterations 315. Each of those five iterations 315 may be performed across five different computing devices or processors and then combined together for clustering or merging at the end of the level 320. This parallel processing at each level 320 may significantly improve the speed with which large sets of content items 304 can be clustered, relative to performing clustering on a single machine or computing device as often required with conventional clustering techniques.

Figure 4:
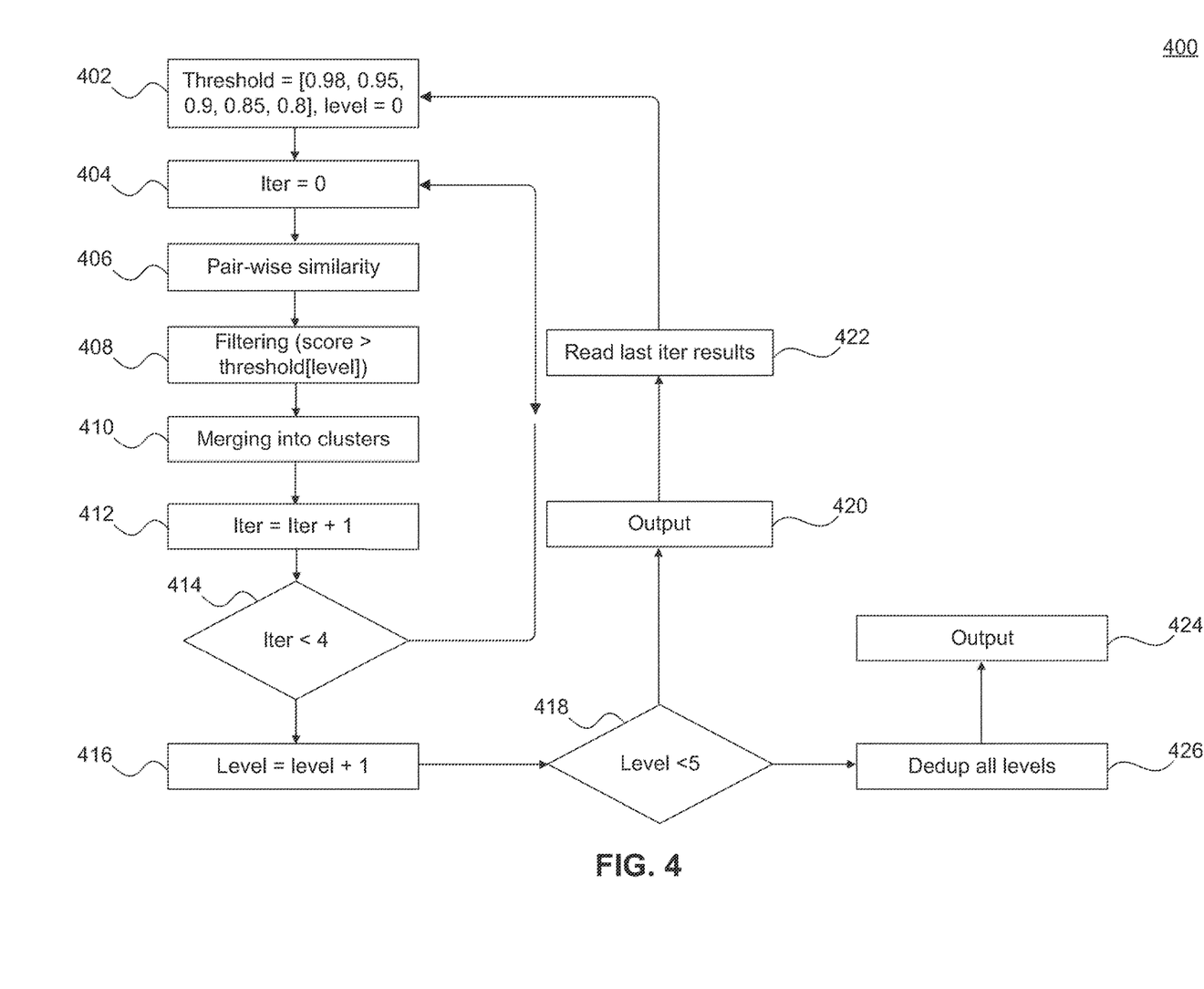
FIG. 4 is a flowchart illustrated example operations for content display and clustering, according to some embodiments.

FIG. 4 is a flowchart 400 illustrated example operations for content display and clustering, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIG. 3. However, method 400 is not limited to that example embodiment.

In step 402, CDS 302 identifies various thresholds 310 for each of a set number of levels 320. In the example illustrated, there are five different levels 320, each with its own similarity threshold 310. For example, the threshold value for level 0 may be 0.98, for level 1, the threshold value may be 0.95, and so on until level 4 which may have a threshold value of 0.8. In some embodiments, CDS 302 may determine that the number of iterations 315 for each level 320 is a fixed number four. However, if the number of iterations is not fixed, CDS 203 may identify which data state 319 is to be detected after each iteration 315 at each level 320.

In step 404, the first iteration in a level 320 may be set to 0. In step 406, a pairwise similarity may be performed. For example, pair identifier 322 may pair different content items 304 (which may include clusters of content items 304, if any) and compute or generate a corresponding similarity score 308 for the paired items.

In step 408, a filtering may be performed in which the similarity score 308 for each pair is compared to threshold 310 for that level to determine which pairs are to be merged together. In step 410, the pairs for which the similarity score 308 exceeds the threshold 310 for that level 320 are merged together into new clusters or bigger clusters. In some embodiments, if two clusters are being merged together, then a new cluster with content items from both clusters may be formed. In step 412, the iteration count is increased by one indicating the previous iteration has completed.

In the example illustrated, a set number of iterations (four) may be used. At step 414, if the iteration count is less than four, then processing may repeat at step 404, and new pairs (different from any other pairs previously grouped together for the level 320) may be grouped together for comparison in step 406. In some embodiments, if the number of iterations is not a fixed number, at 414, CDS 302 may check whether or not the data state 319 has been achieved or detected. And if, the data state 319 has not been detected, CDS 302 may continue with another iteration at step 404. At 414, if four iterations for the level has been reached (or the data state 319 was detected), then processing continues to step 416.

At step 416, once all the iterations for current level have completed, the level count is incremented by one indication a completion of processing during the previous level 320. In the example illustrated, the number of levels may be set to five. However in other embodiments, a different number of levels could be used, or another data state 319 could be used to determine how many levels are to be executed.

At step 418, if the level count is less than five, then processing may continue to step 420. At step 420, the intermediate clustered output 316 from the previous level may be provided to step 422, and input into a new set of iterations for the next level 320.

At step 418, if the level count is equal to five, processing may continue to step 426. At step 426, deduplication is performed across all of the levels. During the deduplication process, CDS 302 may identify how many content items in different clusters overlap with each other. In some embodiments, CDS 302 may be provided with a deduplication threshold to check and see what is considered a duplicate.

For example, if deduplication threshold is set to 80%, then CDS 302 may compare the final clusters to identify any clusters with 80% or greater overlap in terms of content items 304 included in each cluster. If cluster A and cluster B have 82% overlap in the content items 302 included in each cluster, which exceeds the example 80% deduplication threshold, then CDS 302 may merge one cluster into the other and reduce the number of clusters.

In some embodiments, the cluster with the fewer content items may be merged into cluster with greater content items, and the cluster with the fewer content items may be deleted. In other embodiments, this process may be reversed, and the cluster with more content items may be merged into the cluster with fewer content items, and the first cluster may be deleted. If both clusters have the same number of items, then the cluster with the newest content item may be used as the source cluster into which the other cluster is merged.

At step 424, the final clustered output 316 is provided to streaming media device 312 for display via display device 306. User 309 may then scroll the organized or clustered output 316 and select one or more content items 304 for viewing, purchase, or other access.

Figure 5:
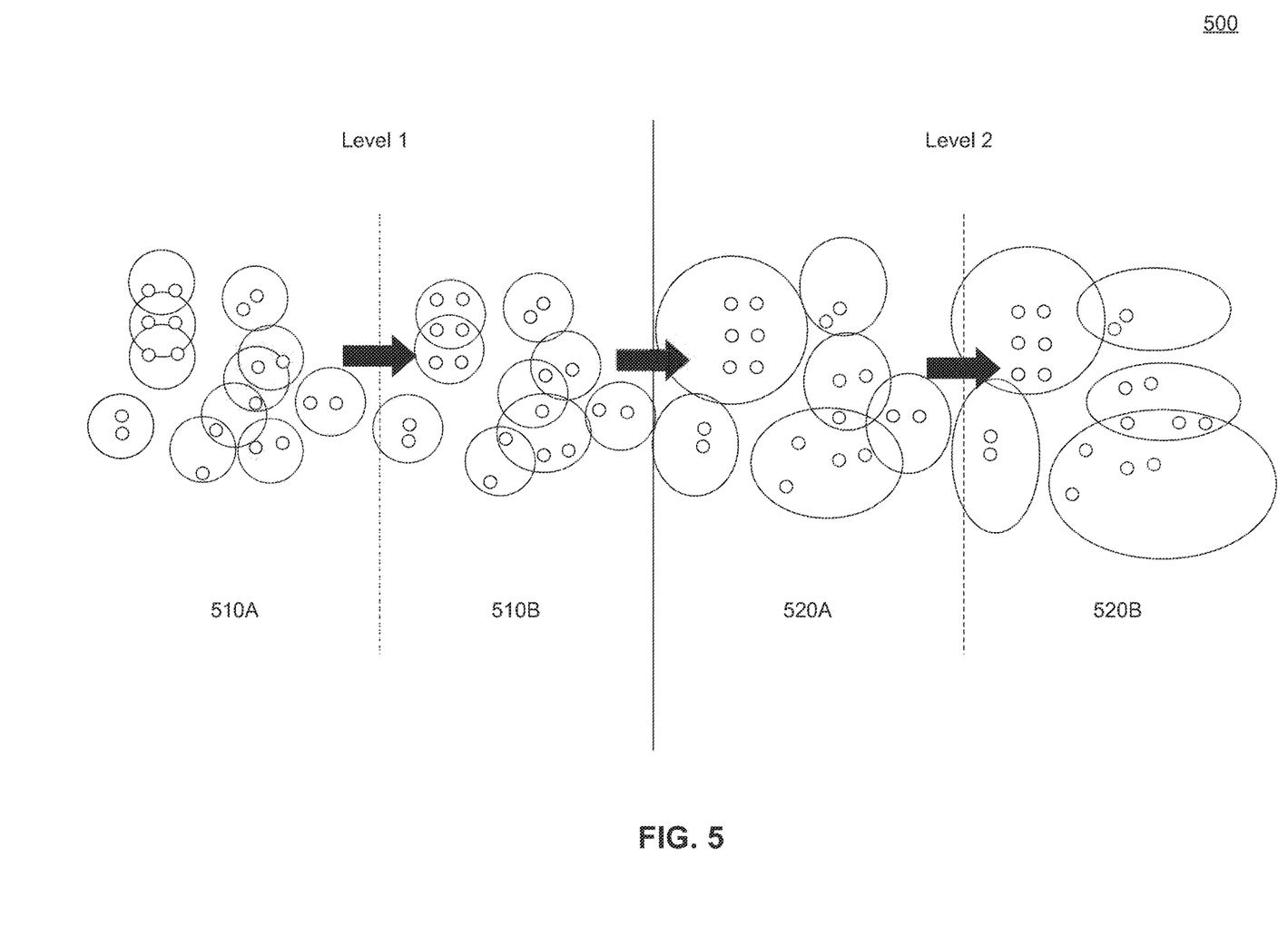
FIG. 5 illustrates an example of performing clustering by a content display and clustering system, according to some embodiments.

FIG. 5 is an example 500 illustrating an example of performing clustering by a content display and clustering system, according to some embodiments. Each of the small circles represent a content item 304, and the larger circles encompassing the smaller circles represent clusters. As illustrated, some content items may belong to multiple different clusters.

Section 510 illustrates a set of input content items 304 to undergo a set of one or more iterations 315 at a first level 320 (level 1). Section 510B illustrates the result of performing the pairwise similarity and clustering at level 1. At the completion of the level 1, the clusters are merged and provided as input to level 2 as illustrated in section 520A. During the operations of CDS 302 on the second level, the three input clusters may be merged into two final clusters as illustrated in section 520B (which may then be output for display or input to the next level of processing (if any)).

Figure 6:
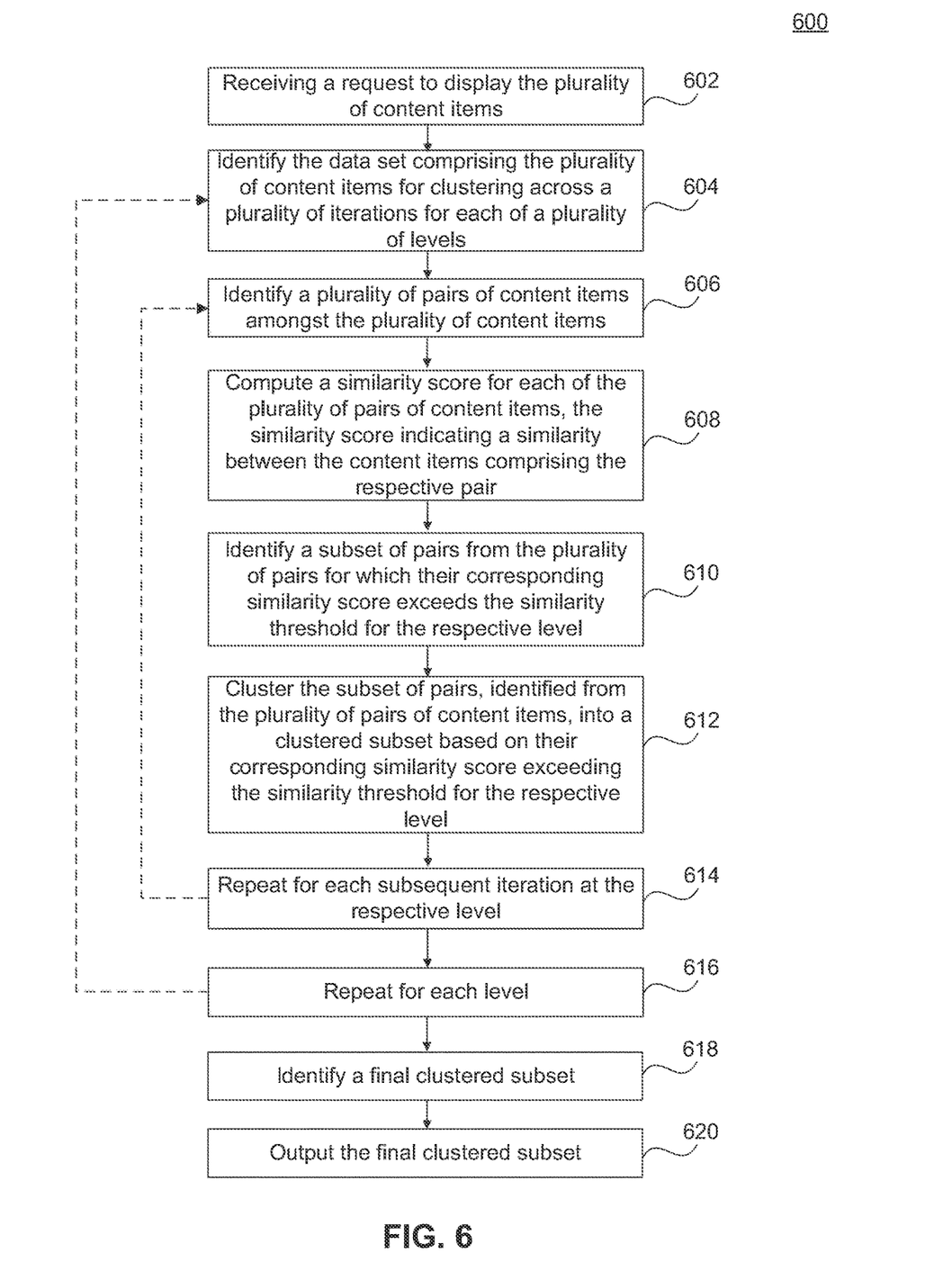
FIG. 6 is a flowchart of a method for content display and clustering, according to some additional embodiments.

FIG. 6 is a flowchart for a method 600 for content display and clustering, according to some additional embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 3. However, method 600 is not limited to that example embodiment.

In step 602, a request to display the plurality of content items is received. For example, CDS 302 may receive a request to display the content items 304 from streaming media device 312, which may have received a request from remote control 314 of user 309.

In step 604 the data set comprising the plurality of content items for clustering across a plurality of iterations for each of a plurality of levels is identified. For example, CDS 302 may identify a set of content items 304 to be clustered across a number of different iterations 315 for each of one or more levels 320. Each level 320 may include its own similarity threshold 310. In some embodiments, each threshold 310 may be a unique value. In some embodiments, the value of threshold 310 for each successive level 320 may be less than the value of threshold 310 for the prior level 320.

In step 606, a plurality of pairs of content items amongst the plurality of content items are identified. For example, pair identifier 322 may identify a set of pairs of content items 304 for a particular iteration 315.

In step 608, a similarity score for each of the plurality of pairs of content items is computed. For example, pair identifier 322 may retrieve or computing similarity score

308 for each pair, the similarity score 308 indicating a similarity between the content items comprising the respective pair.

In step 610, a subset of pairs is identified from the plurality of pairs for which their corresponding similarity score exceeds the similarity threshold for the respective level. For example, clustering engine 318 may identify which pairs identified by pair identifier 322 have a similarity score 308 that meets or exceeds the similarity threshold 310 for that level 320.

In step 612, the subset of pairs, identified from the plurality of pairs of content items, are clustered into a clustered subset based on their corresponding similarity score exceeding the similarity threshold for the respective level. For example, those pairs for which the similarity score 308 exceeds threshold 310 may be combined into a new or bigger cluster.

In step 614, the process goes back to step 606 if there are additional iterations to be performed at the level. For example, at the completion of each iteration 315, at step 616, clustering engine 318 may determine whether there are more iterations 315 to be performed for the current level 320. If there are more iterations 315 to be performed, processing begins for the next iteration continues at step 606, otherwise processing continues to 616.

In step 616, at the conclusion of the final iteration 315 for a level 320, if there are additional levels 320 of clustering, then processing repeats at 604 for the next level 320. The input for 604 may be the clustered output 316 from the previous level 320. If, however, the final level 320 has completed, then processing continues to step 618.

In step 618, a final clustered subset is identified. For example, the clustered output 316 including a clustered version of the content items 304 is identified. In step 620, the final clustered subset is output. For example, the clustered output 316 is output to streaming media device 312 for display on display device 306.

Example Computer System

Figure 7:
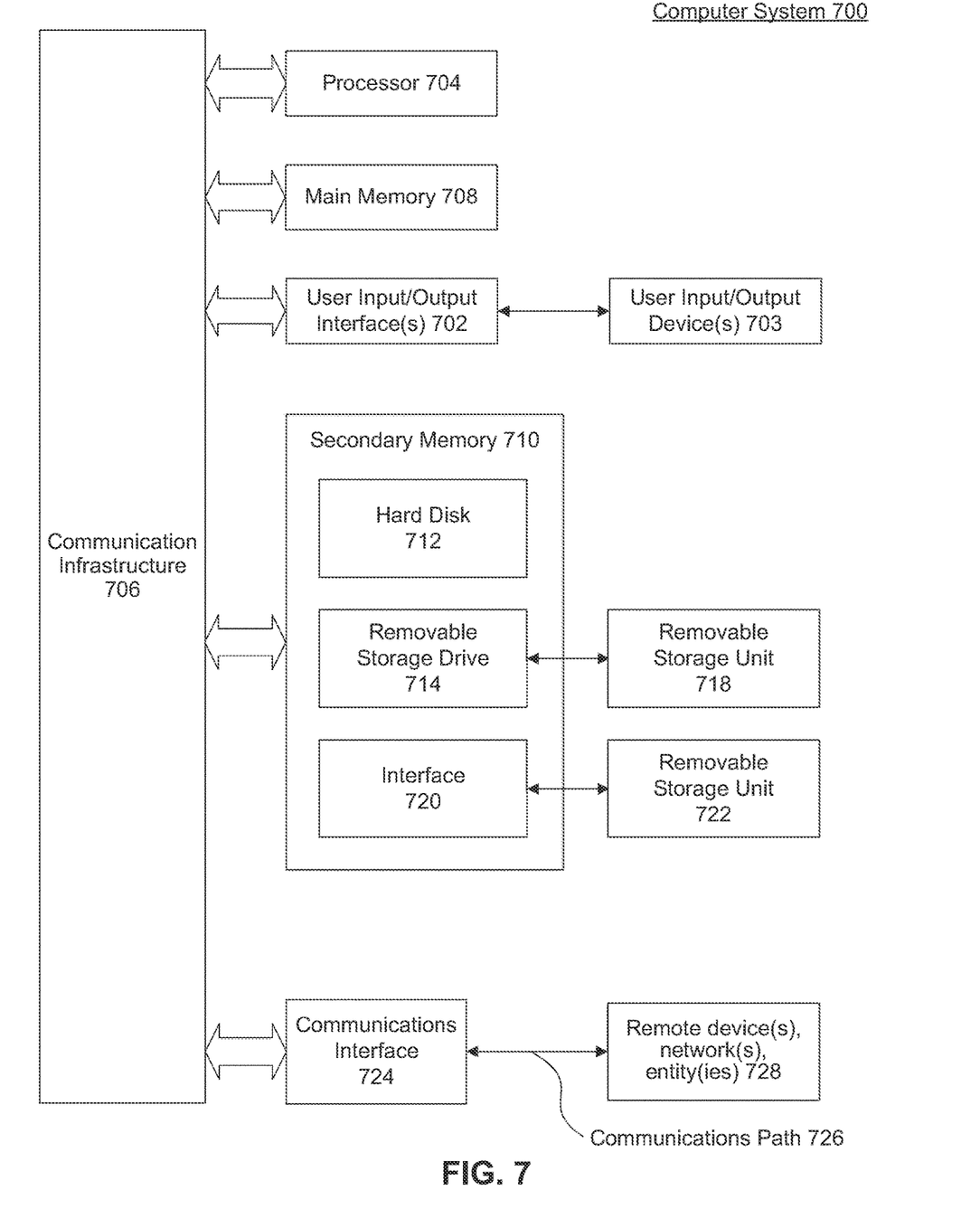
FIG. 7 illustrates an example computer system useful for implementing various embodiments.

Various embodiments may be implemented, for example, using one or more well-known computer systems, such as computer system 700 shown in FIG. 7. For example, the media device 106 may be implemented using combinations or sub-combinations of computer system 700. Also or alternatively, one or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/ any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700 or processor(s) 704), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for clustering a plurality of content items of a data set, comprising:
   receiving, by at least one computer processor, a request to display the plurality of content items;
   identifying the data set comprising the plurality of content items for clustering across a plurality of iterations for each of one or more levels, each level of clustering comprising a different similarity threshold;
   performing for each of the one or more levels:
      computing a similarity score for each of a plurality of pairs of content items;
      identifying a subset of pairs from the plurality of pairs, wherein the similarity score, for each pair from the subset of pairs, exceeds a similarity threshold for a respective level;
      clustering the subset of pairs, for each pair from the subset of pairs that exceed the similarity threshold for the respective level, into a clustered subset based on the similarity score; and
      repeating the computing the similarity score, the identifying the subset, and the clustering the subset for each of the plurality of iterations for the respective level, for each subsequent iteration at the respective level;
   identifying a final clustered subset comprising the clustered subset after each of the plurality of iterations for each of the one or more levels after the performing has been completed; and
   outputting the final clustered subset for display, responsive to the request to display the plurality of content items.

2. The computer-implemented method of claim 1, wherein the outputting comprises:
   determining that the final clustered subset comprises a first content item from the plurality of content items included in two or more clusters of the final clustered subset; and
   outputting the final clustered subset for display, wherein the first content item appears in each of the two or more clusters.

3. The computer-implemented method of claim 1, further comprising:
   determining a first content item of the plurality of content items was clustered into a first cluster during a first iteration at a first level; and determining the first content item was clustered into a second cluster during a subsequent iteration at the first level.

4. The computer-implemented method of claim 1, further comprising:
determining a first content item of the plurality of content items was clustered into a first cluster during a first iteration at a second level; and
determining the first content item was clustered into a second cluster during a subsequent iteration at the second level.

5. The computer-implemented method of claim 1, wherein the clustering comprises:
determining that one or more of the plurality of content items were not clustered as part of the clustering the subset of pairs.

6. The computer-implemented method of claim 1, wherein a number of the plurality of iterations to be performed at each of the one or more levels is unknown at the identifying the data set, and the computer-implemented method further comprises:
determining that the plurality of iterations is based on identifying a data state.

7. The computer-implemented method of claim 6, further comprising:
determining, after determining the clustered subset, whether the data state has been achieved,
wherein if the data state has been achieved, performing the identifying the final clustered subset is performed, and
wherein if the data state has not yet been achieved, the repeating is performed.

8. The computer-implemented method of claim 6, further comprising:
determining, after determining the clustered subset, that the data state has been achieved; and
performing the identifying the plurality of pairs for a next level of the one or more levels.

9. The computer-implemented method of claim 1, wherein a second similarity threshold for a second level is less than a first similarity threshold for a first level.

10. The computer-implemented method of claim 1, wherein the plurality of content items include a plurality of multimedia content items, and wherein the outputting comprises outputting the final clustered subset via a streaming media device configured to provide the plurality of multimedia content items for display.

11. A system, comprising:
one or more memories; and
at least one processor each coupled to at least one of the memories and configured to perform operations comprising:
receiving a request to display a plurality of content items;
identifying a data set comprising the plurality of content items for clustering across a plurality of iterations for each of one or more levels, each level of clustering comprising a different similarity threshold;
performing for each of the one or more levels:
computing a similarity score for each of a plurality of pairs of content items;
identifying a subset of pairs from the plurality of pairs, wherein the similarity score, for each pair from the subset of pairs, exceeds a similarity threshold for a respective level;
clustering, for each pair from the subset of pairs that exceed the similarity threshold for the respective level, into a clustered subset based on the similarity score; and
repeating the computing the similarity score, the identifying the subset, and the clustering the subset for each of the plurality of iterations for the respective level, for each subsequent iteration at the respective level;
identifying a final clustered subset comprising the clustered subset after each of the plurality of iterations for each of the one or more levels after the performing has been completed; and
outputting the final clustered subset for display, responsive to the request to display the plurality of content items.

12. The system of claim 11, wherein the outputting comprises:
determining that the final clustered subset comprises a first content item from the plurality of content items included in two or more clusters of the final clustered subset; and
outputting the final clustered subset for display, wherein the first content item appears in each of the two or more clusters.

13. The system of claim 11, the operations further comprising:
determining a first content item of the plurality of content items was clustered into a first cluster during a first iteration at a first level; and
determining the first content item was clustered into a second cluster during a subsequent iteration at the first level.

14. The system of claim 11, the operations further comprising:
determining a first content item of the plurality of content items was clustered into a first cluster during a first iteration at a second level; and
determining the first content item was clustered into a second cluster during a subsequent iteration at the second level.

15. The system of claim 11, wherein the clustering comprises:
determining that one or more of the plurality of content items were not clustered as part of the clustering the subset of pairs.

16. The system of claim 11, wherein a number of the plurality of iterations to be performed at each of the one or more levels is unknown at the identifying the data set, and the operations further comprise:
determining that the plurality of iterations is based on identifying a data state.

17. The system of claim 16, the operations further comprising:
determining, after determining the clustered subset, whether the data state has been achieved,
wherein if the data state has been achieved, the identifying the final clustered subset is performed, and
wherein if the data state has not yet been achieved, the repeating is performed.

18. The system of claim 16, the operations further comprising:
determining, after determining the clustered subset, that the data state has been achieved; and
performing the identifying the plurality of pairs for a next level of the one or more levels.

19. The system of claim 11, wherein a second similarity threshold for a second level is less than a first similarity threshold for a first level.

20. A non-transitory computer-readable medium having instructions stored thereon that, when executed by at least one computing device, cause the at least one computing device to perform operations comprising:

receiving a request to display a plurality of content items;

identifying a data set comprising the plurality of content items for clustering across a plurality of iterations for each of one or more levels, each level of clustering comprising a different similarity threshold;

performing for each of the one or more levels:

computing a similarity score for each of a plurality of pairs of content items;

identifying a subset of pairs from the plurality of pairs, wherein the similarity score, for each pair from the subset of pairs, exceeds a similarity threshold for a respective level;

clustering, for each pair from the subset of pairs that exceed the similarity threshold for the respective level, into a clustered subset based on the similarity score; and         repeating the computing the similarity score, the identifying the subset, and the clustering the subset for each of the plurality of iterations for the respective level, for each subsequent iteration at the respective level;

identifying a final clustered subset comprising the clustered subset after each of the plurality of iterations for each of the one or more levels after the performing has been completed; and     outputting the final clustered subset for display, responsive to the request to display the plurality of content items.

\* \* \* \* \*